United States Patent [19]
Pravda et al.

[11] 3,766,977
[45] Oct. 23, 1973

[54] HEAT SINKS

[76] Inventors: Milton F. Pravda, 7708 Greenview Terrace; Walter B. Bienert, 7003 Kenleigh Road, both of Baltimore, Md.

[22] Filed: Sept. 15, 1972

[21] Appl. No.: 289,731

[52] U.S. Cl. .................... 165/47, 165/80, 165/185
[51] Int. Cl. .................... F24h 3/08
[58] Field of Search .................... 165/47, 80, 185

[56] References Cited

UNITED STATES PATENTS 2,936,409 5/1960 Jackson et al. .................... 165/80

*Primary Examiner*—Charles Sukalo
*Attorney*—A. H. Caser et al.

[57] ABSTRACT

Improved heat sinks, especially aluminum heat sinks, are provided for cooling heat-producing electrical and electronic components, such as diodes and thyristors, including SCR (silicon controlled rectifier) type semiconductors.

10 Claims, 7 Drawing Figures

HEAT SINKS

BACKGROUND OF THE INVENTION

The field of the invention comprises air-cooled heat sinks for cooling heat-producing electrical and electronic components. In a conventional aluminum heat sink for cooling, say, a thyristor, the sink may be formed from two units of substantially equal lengths, each comprising a web or wall having fins extending from one side and having the other side in the form of a flat planar surface which extends throughout the length of the unit. The thyristor end faces are tightly engaged between, and compressed by, the flat planar surfaces of a pair of units, such that said surfaces are spaced apart and are parallel to each other. Usually a clamp is used to compress the units against the thyristor, and the resulting device is generally termed a "power package." If two thyristors are used, they are placed in spaced-apart relation on the planar surface of one unit; the other end surface of each thyristor is then engaged by the planar surface of a shorter unit, two such short units being required, so that a total of three units are employed, with the long unit being more than twice the length of each short unit. Suitable electrical connections are provided so that current may flow through the units and thyristors in the desired way. Heat is removed through both end faces of each thyristor, conducted through the walls of the units to the fins, and there dissipated to atmosphere. In the case of stud-mounted thyristors, described below, heat is removed through only one end face. With the advent of higher power semiconductors, these aluminum heat sinks do not cool well enough, permitting such high temperatures to be reached as to decrease the service life of the semiconductors. Essentially, the fault lies with the all-aluminum construction of the heat sink, i.e., the thermal conductivity of the aluminum is too low for the desired application; but it is also apparent that the design of some conventional heat sinks may contribute to their reduced cooling power. Copper is a better material for heat sinks, having a thermal conductivity almost twice as high as aluminum, but copper sinks are much more expensive and they are more difficult to produce because copper must be cast into desired form whereas aluminum units are extrudable. In view of the large numbers of semiconductors that are beging used, it is obvious that copper sinks are too expensive for ordinary use and, for this reason, are difficult to justify.

According to the invention, a heat sink is provided which retains the finned aluminum construction, particularly the low cost extrusion manufacture of the same, and which adds to it at a critical location a small amount of copper, thus combining the low cost advantage of aluminum and the superior performance of copper, and yet avoiding the expensiveness of the latter. Furthermore, the invention enhances the heat transfer capability of the extruded aluminum portion of the heat sink by improving the configuration of the same. Other advantages relate to the improvement of the interface between the end face of the thyristor or other component and the mating face on the copper plug; and to the electrical isolation of the aluminum heat sink from the current path.

SUMMARY OF THE INVENTION

The heat sinks of the invention, in a preferred form, comprise at least a pair of aluminum units each made up of a wall or web having fins extending from one side and having the other side partly in the form of a flat planar surface. The wall of each unit has a substantially centrally located recess therein which opens through the planar surface, and in such recess a copper plug is fitted with sufficient tightness to permit good heat transfer and current flow from the plug to the wall. The plug has an exposed surface which is coextensive in size with, and engages, in heat exchange relation, an end face of a heat-producing component, for example, a semiconductor. Thus, each end face of the semiconductor is compressively engaged by a copper plug. Heat is transferred across the SCR/plug interfaces to the plugs by conduction, then from the plugs to the aluminum walls by conduction, and it is dissipated to atmosphere by the fins on said walls. The device is, of course, effective to pass electric current. Preferably, the plugs are shrink fitted in said recesses so that during the passage of heat therethrough the plugs are in a state of compression in the recesses. In addition, not only are fins provided on the said one side of each wall but also throughout substantially the entire area of the said other side except for the area occupied by the plug, thus rendering it unnecessary to have one side entirely without fins and considerably increasing the heat-dissipating ability of the fins as a whole. Suitable means, such as clamps, may be used to hold the units in compressive engagement with the semiconductor.

The invention is also applicable to single heat sink units wherein the component to be cooled has a face which engages a copper plug-containing surface of the unit. A conventional electric lead is attached to another part of the component and brought out of the unit. This type of heat sink is of use with stud-mounted thyristors.

According to a modification, the invention provides for electrically, but not thermally, insulating the semiconductor or other component from the heat sink units, thus adapting the power package for use in special applications.

A further modification is provided to improve the interface between the semiconductor and the plug by interposing a layer of a suitable low melting metal which, during operation of the power package, is melted by the heat and forms a liquefied interface capable of being retained in position and of effectively transferring heat and electricity from the semiconductor to the plug. While solders, both soft and hard, have been tried in the interface hitherto, their use has not been successful as soft solders produce shearing, while hard solders produce strain in the silicon wafer of SCRs, leading to cracks.

The invention further provides heat sinks of various other metals, besides aluminum, having plugs made of copper and other metals.

BRIEF DESCRIPTION OF THE DRAWINGS

The invention is illustrated in the accompanying drawings, which are diagrammatic, and in which.

DESCRIPTION OF THE SPECIFIC EMBODIMENTS

Figure 1:
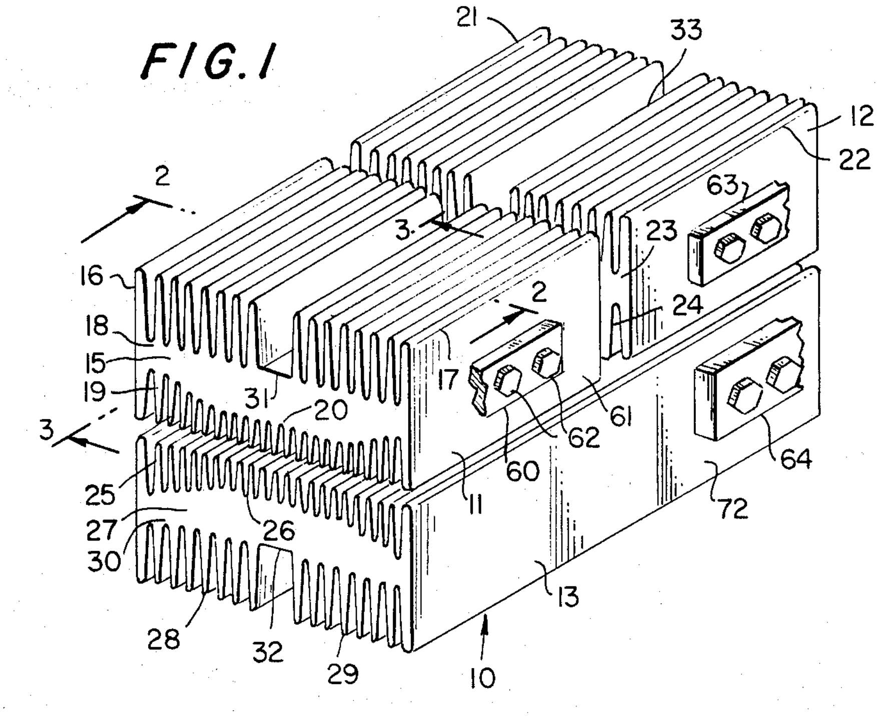
FIG. 1 is a perspective view of a three-unit heat sink with part of the construction omitted.
Figure 3:
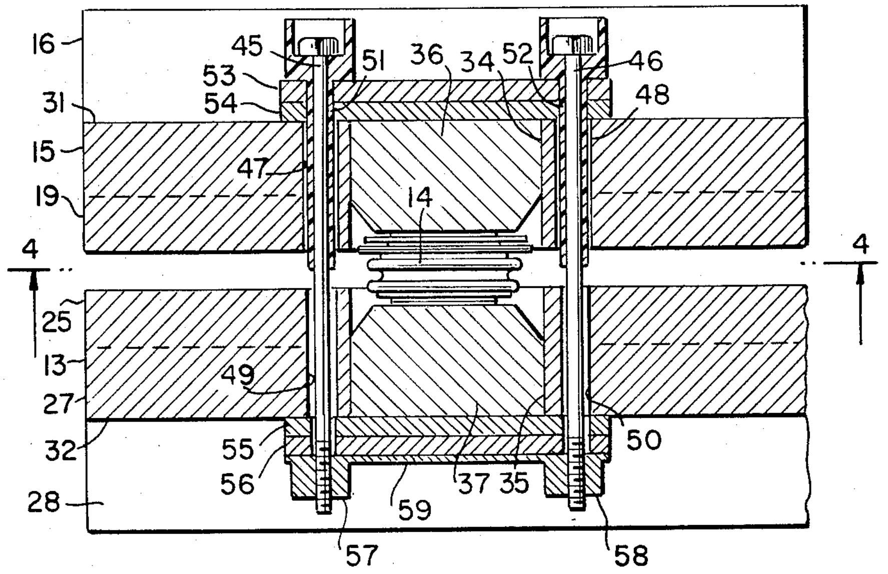
FIG. 3 is a longitudinal sectional view along line 3—3 of FIG. 1, i.e., only unit 11 is sectioned.
Figure 2:
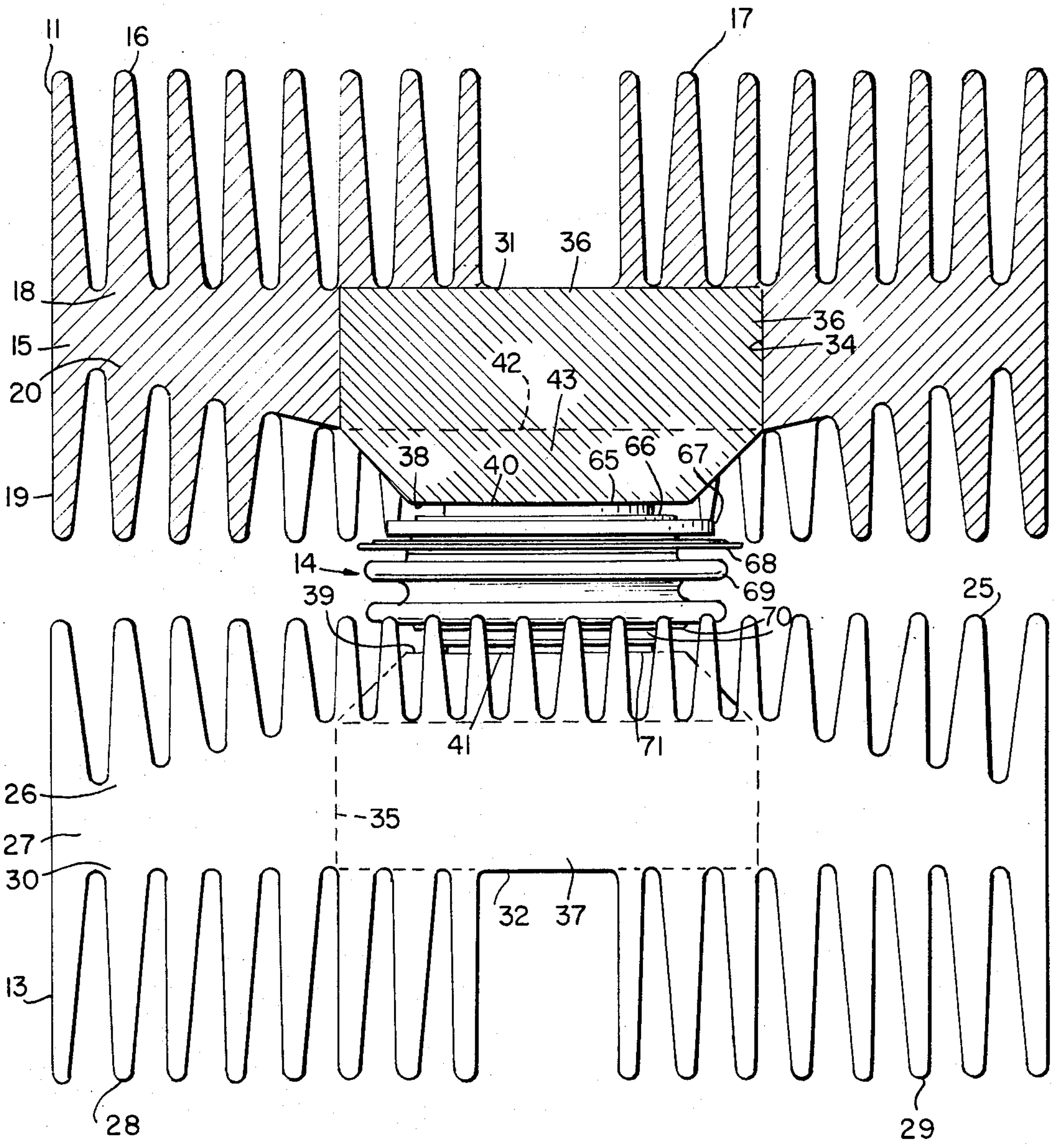
FIG. 2 is a combined cross-sectional and end view, on an enlarged scale, with the section being taken along line 2—2 of FIG. 1; in other words, the upper unit 11 of FIG. 1 is shown in section and an end view of the lower unit 13 is shown.

Referring to FIG. 1, the heat sink 10 comprises three heat sink units 11, 12, and 13 and two semiconductors, the latter not being visible although one is shown at 14 in FIGS. 2 and 3. As will be described, heat sink 10 is an example of a "power package;" and a semiconductor or SCR, as used therein, is a reverse blocking triode thyristor, i.e., a three-terminal solid state electrical switching device that allows large current flow in the forward or rectifying direction when a small signal is applied to a control or gate terminal of the device and that blocks current flow in the reverse direction. Very large currents may flow through these SCRs, going up to 1,000, 2,000, or more amperes, and as may be realized, such currents produce heat (generated by $I^2R$ and other losses) which must be dissipated. The problem is complicated by the fact that the heat must be removed from the SCR end faces, each usually of a diameter of less than 2 inches.

Each SCR or thyristor in heat sink 10 is held so that its flat end faces are engaged by a flat planar surface of a heat sink unit. Thus, SCR 14 is engaged by the units 11 and 13, and the second SCR is engaged by units 12 and 13. Each unit is an aluminum extrusion comprising a web or wall having fins extending therefrom. Unit 11 thus comprises the web 15 having two groups of fins 16, 17 extending from side 18 and a group of fins 19 extending from side 20; unit 12 has a fins 21, 22 on the upper side of web 23 and fins 24 on the lower side; and unit 13 has fins 25 on the upper side 26 of web 27 and two groups of fins 28, 29 on the lower side 30. Means are provided on each unit for compressing together a pair of units having an SCR therebetween; on unit 11 such means comprises on side 18 a planar unfinned strip 31; on unit 13 it comprises a similar strip 32 on side 30 of web 27; and on unit 12 it comprises a similar strip 33. These strips permit clamping or bolting together of units 11 and 13 having the SCR 14 therebetween, and of units 12 and 13 having the second SCR therebetween.

Actually, units 11 and 12 are the same. Except for the recesses noted just below, unit 13 is also the same as units 11 and 12 but is longer, being more than two times as long. These units are simply lengths cut off from extruded stock. As may be seen from FIGS. 2, 3, and 4, unit 11 has a recess 34, preferably a circular one although it may have any other suitable outline shape, in the web 15 which opens through the side 20. Unit 12 has a similar recess, not shown, and unit 13 has two recesses one of which is seen at 35 of FIGS. 2 and 3 and is disposed opposite recess 34. The other recess, not shown, is opposite the recess in unit 12. In each recess a plug of copper is disposed, note plugs 36 and 37 in recesses 34 and 35 (FIGS. 2 and 3), which has the same outline shape as the recess. The plug has a sufficiently tight compression fit in the recess as to permit good heat transfer and current flow between the plug and the web of the heat sink units; preferably the plug is shrink-fitted into the recess, a process comprising providing the plug of slightly larger diameter than the recess, heating the heat sink unit to 300° to 600° F. to expand the same, including expanding the recess, cooling the plug to −100° to plus 32° F. to contract it, and placing the cooled plug in the expanded recess. When the plug and heat sink return to room temperature, the plug will have a shrink fit in the recess, i.e., the walls of the recess will have contracted about the plug. The difference between the larger diameter of the plug over the smaller diameter of the recess, at ambient conditions, is termed the "interference," and for purposes of the invention it is desirable that the interference shall be at least 0.001 or 0.002in. and range up to 0.004, 0.006, 0.008 in. or higher; preferably it increases with increasing diameter of the plug, say 0.002 in. for each inch of plug diameter.

Each plug has an exposed surface, note surfaces 38, 39 in FIG. 2, which respectively engages the end faces 40, 41 of the SCR 14. These face or surface engagements are effective for the passage of current therethrough and also for the transfer of heat from the SCR to the plugs. From each plug, heat passes by conduction to the aluminum web of each unit, then to the fins, and it is dissipated by the latter to atmosphere.

It will be noted (FIG. 2) that plug 36 extends for only part of its length into the recess 34, the mouth of which is located at the broken line 42, this line also representing the lower surface of web 15. Beginning at this line 42, the plug is tapered over a short distance 43 before it terminates in the end face 38. The purpose of the taper is to conserve material and weight without materially affecting performance. The opposite plug 37 and recess 35 are similar in construction to the foregoing and need not be described.

It may be mentioned that a shrink fit, as described, provides very effective thermal and electrical contact between the plug and the heat sink web. It is significant that during thermal cycling of the heat sink, the plug is in a state of compression. It may be noted that thermal cycling occurs during conditions when electrical equipment connected to the heat sink is alternately turned on and off. When the equipment is turned on, the heat sink will get hot and dissipate heat, and when the equipment is turned off, the fans blowing air over the fins will cool the heat sink. The plug is in a state of compression by virtue of the interference factor, described above, which is effective even at elevated temperatures. For example, consider an interference factor at room temperature (68° F.) of 0.002 inch. If the heat sink is heated to 168° F., the aluminum will expand more than the copper plug, and the plug will loosen by about 0.0004 inch. But this is less than the interference factor, and therefore some residual compression will be present acting on the plug. If the heat sink is to be heated to higher temperatures, the interference factor will be so chosen, within the above range, as to leave the plug under a residual compression.

In FIG. 3 is shown a means for compressively holding the heat sink units in effective electrical and thermal contact with the SCRs. A pair of tension bolts 45, 46 is provided for holding the units 11 and 13 against the SCR 14. First, bolt holes 47, 48 and 49, 50 are made in units 11 and 13, these holes opening through the unfinned strip portions 31 and 32. Then electrically insulating sleeves 51, 52, as of nylon, Teflon, etc., are placed in the holes of the upper unit 11 and under the heads of the bolts 45 and 46, thereby electrically insulating upper unit 11 from the bolts. Leaf springs 53, 54 and 55, 56 are used to place the bolts under tension to permit expansion and contraction of the different materials and the SCRs during temperature changes. The whole is assembled as shown in FIG. 3, and nuts 57, 58 are used to apply a suitable amount of compression. The nuts are attached to the flat strip 59 to prevent rotation when tightened.

It will be understood that other compressive means may be used, such as end clamps that engage strip portions 31 and 32 of units 11 and 13 and extend between the units along the end surfaces thereof.

In FIG. 1 there is illustrated the manner of introducing electric current to the heat sink. An electrical bus 60, connected to a source of supply not shown, is attached to the smooth side 61 of unit 11 by bolts 62 which enter the web 15 as shown. Another like bus 63 is similarly attached to unit 12, and a larger bus 64 to the long unit 13. It will be understood that these rigid bus bars extend in the direction of the broken-off end. The source of electrical energy to the power package is AC. In FIGS. 1–4, the power package converts AC current to pulsating DC current. The SCR between units 11 and 13 is in parallel with the SCR between units 12 and 13. Current flows through bus bar 64 into the unit 13 and divides equally between the SCRs. Current flows out of the bus bar 63 and bus bar 60, each of which may be connected to individual pieces of equipment (not shown), in which case half the current flowing through bar 64 will flow through each piece of equipment. Alternatively, units 11 and 12 may be connected to each other by a flexible strap, and a single bus bar from 11 and 12 may then be connected to a single piece of equipment; in this case, the current flowing through basr 64 will also flow through the single piece of equipment.

Figure 4:
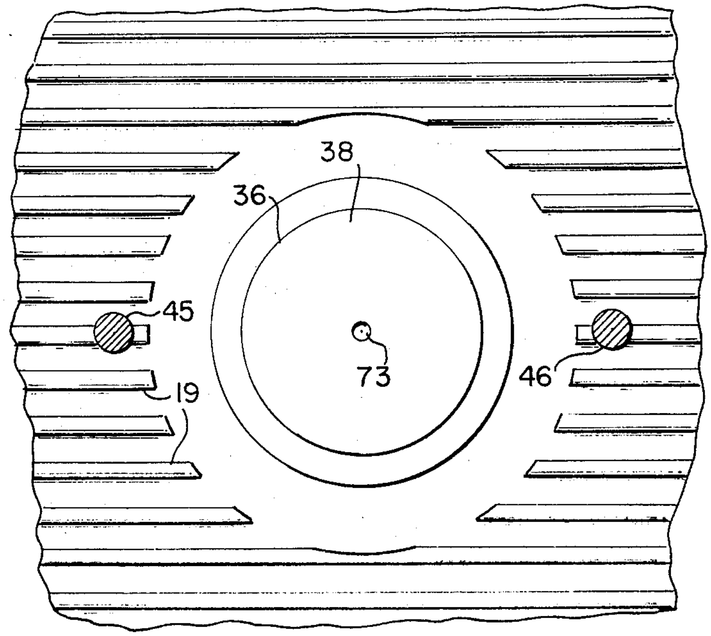
FIG. 4 is a sectional view along line 4—4 of FIG. 3 but showing only part of the construction and omitting the component.

In FIG. 4, a small central opening 73 is seen in the surface 38 of plug 36. This is for use in centering the semiconductor in position in the power package; it reeives a centering pin, not shown, which also engages a small opening, not shown, in the semiconductor.

Although the SCR 14 per se is not a part of the invention, a brief description of it may be of interest. Current from the copper plug 36 enters the SCR at the end face or working junction 65 (FIG. 2), also called the cathode. At 66 is a thin bellows sheet below which is an insulator 67. A control or gate terminal is at 68, this being the place which supports the silicon element or wafer and to which conducting wires, not shown, are attached to apply a small current signal, and above and below are bellows components. At 69 is an insulation piece so shaped as to increase the electrical breakdown path. Bellows components are at 70, and the working junction or anode at 71. The cathode 65 has a surface 40 which makes contact with end face 38 of plug 36, and the anode 71 has a surface 41 which engages end face 39 of plug 37. The conducting wires attached to the gate 68 are of course brought out of the heat sink and usually are attached to a connector conveniently mounted on an outer surface, such as the surface 72 (FIG. 1). It may be mentioned that the purpose of the insulation is twofold: to bring out of the SCR the control lead which can be isolated from the electrical potential between the SCR end faces, and to prevent the main current from bypassing the SCR. The purpose of the bellows is to permit the power package to be flexible so that pressure can be transmitted directly to the silicon wafer.

SCRs such as at 14 may be of varying size and may be used to pass varying currents, with the size increasing with the current. Thus, wafer diameters may range from 1 to 102 mm. or more, and across such small areas the current may range from 1 to 1,000, 2,000, 4,000 or more amperes. As there is always a drop of 1 or 2 volts across the junction, the power loss, as heat, is high; thus, at 1,000 amps. and a drop of 1 volt, the loss is 1,000 watts, and at 4,000 amps. and a drop of 2 volts, the loss is 8,000 watts. These large heat losses must be dissipated, and in a continuous way, in order to prevent the SCR from reaching destructive temperatures. Preferably, the temperature of the SCR is kept below 140° C., and more preferably below 125° C. As is known, these devices are useful to modulate the power to electric motors, ovens, lamps, and other adjutable energy applications.

A preferred SCR devices is a thyristor. It may also be a diode. Other heat-producing components that may be cooled are transistors, resistors, transformers, switches, reactors, capacitors, etc. It will be understood that these components have suitable surfaces engageable by one or more heat sink units and that they may be suitably modified, if necessary, in order to install them in a heat sink, or the heat sink units may be suitably shaped to receive them.

The power packages described and illustrated herein are some times termed "power packs." As indiated, three heat sink units may be used to hold two SCR devices, and four units (one long and three short) may be used to hold three semiconductors. In short, any suitable number of semiconductors may be used with a long unit and as many short units as there are semiconductors. As noted, the invention is also applicable to "stud-mounted" SCRs, wherein only one end face of one SCR is engaged by a heat sink cooling surface, the other end face being connected to an ordinary electrical bus; the SCR is secured to the heat sink by conventional means, for example, a copper stud and nut, or a threaded copper stud, etc.

Aluminum and high aluminum alloys are the preferred heat sink metals, and of these, extrudable aluminum alloys are preferred, although aluminum casting alloys are quite suitable. Also useful are extrudable magnesium alloys, extrudable zinc alloys, die casting zinc alloys, and magnesium casting alloys. The preferred metals have a thermal conductivity of at least 90 or 100 BTU per hr. per sq. ft. per ° F. per ft. at or near the operating temperature of the heat sink; these include aluminum, copper, gold, silver, magnesium, bronze, etc. But for some purposes, metals having lower thermal conductivities may be useful, going down to at least 25 or 30 BTU/hr. per sq. ft. per ° F. per ft., and this is particularly true where the plug metal is copper. Metals having thermal conductivities of 25 BTU/hr. per sq. ft. per ° F. per ft. and up include cadmium, iron, steel, nickel, platinum, tantalum, tin, zinc, brass, etc. The heat sink metal should of course be fabricatable and should retain its strength during use. Generally, metals that are good thermal conductors also have low electrical resisttivities; thus, a metal whose thermal conductivity is 100 BTU etc. usually has an electrical resistivity of about 3.8 microhm-cm.

Copper is preferred for the plug, although other suitable metals include high copper alloys like bronze, brass, etc. In general, the plug metal should have a thermal conductivity that is at least twice that of the heat sink metal, and on this basis the plug metal may be any metal having a thermal conductivity of at least 50 or 60.

The plug may have a diameter that corresponds to the diameter of the component end face which it engages; usually the diameter ranges from one-fourth to 2 inches or more. It should be understood that the larger the diameter of the plug, the larger is the amount of heat which may be diffused from it.

In shrink-fitting the plug into the heat sink unit recess, it is desirable to heat the unit to temperatures at least as high as will be encountered in operation.

Generally, the end faces of the SCR or other component are smooth, and the plug has a surface to correspond; but if the component has uneven or irregular faces, the plug surface can be made to correspond. Provision can also be made for non-circular component faces.

Figure 5:
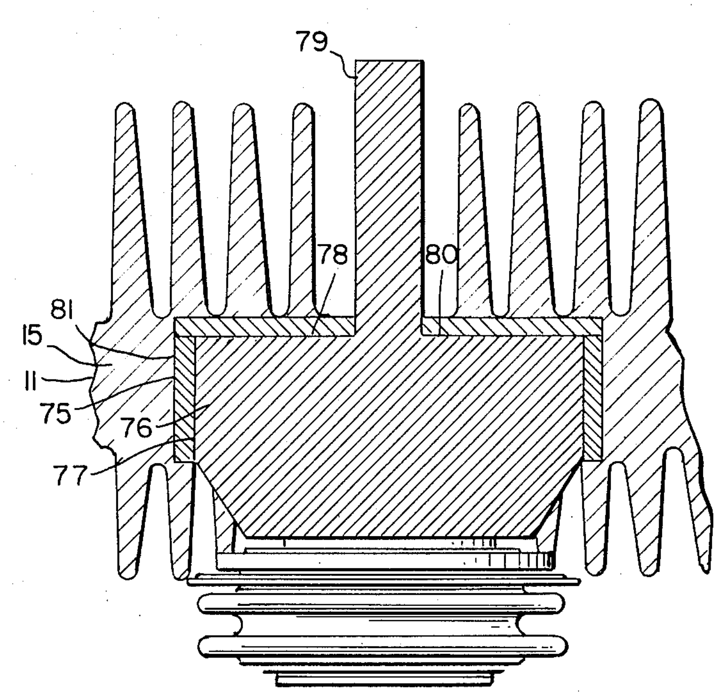
FIG. 5 is a partial cross-sectional view of unit 11 of FIG. 2 but illustrating a modification.

In the modification of FIG. 5, an electrically insulating, thermally conducting liner 75 separates the plug 76 from the aluminum heat sink unit 11. As the unit 11 does not conduct current in this case, the construction is useful to enable several SCRs of varying potential to be mounted on a single heat sink. It is further useful because it allows a manufacturer of electrical equipment to mount an electrically "dead" heat sink directly on the walls of an enclosing cabinet, whereas "live" or "hot" heat sinks cannot be so mounted. It will be noted that in FIG. 5 the liner encloses the cylindrical sides 77 of the plug and also most of the end face 78, except for an extension 79 of the plug which projects upwardly from the upper side 80 and which serves as a connector for an electrical lead. A preferred liner material is beryllium oxide, BeO, having a high density, i.e., a density greater than about 2.92 gm./cc. This oxide is an excellent electrical insulator, having a resistivity of more than $10^{14}$ ohm-centimeters; it has very good thermal conductivity, namely, 140 to 150 BTU/hr. per sq. ft. per °F. per ft., which is superior to that of a useful heat sink material, 6063 aluminum alloy, whose thermal conductivity is 121 BTU etc. The liner cap 75 may suitably be formed around the plug 76, and then the capped plug shrink-fitted into recess 81 in the manner described above, it being understood that, at ambient conditions, the diameter of the capped plug is larger than the diameter of the recess. Beryllium oxide has an adequate compressive strength to serve as a liner cap, namely, 260,000 kg./sq. cm., which precludes crushing. It may be noted that in FIG. 5, if the heat sink fins above the oxide end face 78 were omitted, the end face 78 itself could be omitted, leaving only the cylindrically-shaped oxide liner 77. In this case, the plug 76 could extend through the upper side of web 15 of unit 11, and an electrical connection made directly to such plug or to an extension like 79 attached thereto.

A preferred beryllium oxide material is one available commerically as "Alsimag 754," a product of American Lava Corp., which is a dense material containing 99.5 percent BeO. Another is "Alsimag 794," which is like it but more dense.

Other materials suitable for use as liners include alumina, $Al_2O_3$, especially dense materials corresponding to American Lava Corp.'s "Alsimag 771" having 94 percent alumina, "Alsimag 614" having 96 percent alumina, "Alsimag 753" having 99.5 percent alumina, and "Alsimag 772" having 99.5 percent alumina. These materials have a compressive strength of well over 300,000 kg./sq. cm. Where the heat sink is aluminum, a convenient way of placing an aluminum oxide liner between the plug and the recess in the heat sink unit is to subject the unit, or the walls of the recess thereof, to anodizing, thereby forming aluminum oxide in situ. The metal plug is then shrink fitted in the lined recess as described. Still other liner materials are steatite, $MgO.SiO_2$, corresponding to "Alsimag 460;" titania, $TiO_2$, corresponding to "Alsimag 192" and "Alsinag 193;" Zircon, $ZrO_2.SiO_2$, corresponding to "Alsinag 475 ." Mica, preferably in thin sheets, may be suitable. It will be seen that the preferred liner material is a refractory metal oxide, particularly an oxide of a metal from Groups 2*a* and 4*b* of the Periodic System as published by Dyna-Slide Co., 1962. A preferred group of liner materials are oxides of beryllium, magnesium, and aluminum, these being oxides of light metals. In general, the liner should not crack, or be crushed, or adversely affect the shrink fit; it should be a good electrical insulator; it should have suitable thermal conductivity; and it should be compatible with the heat sink and plug materials.

Figure 6:
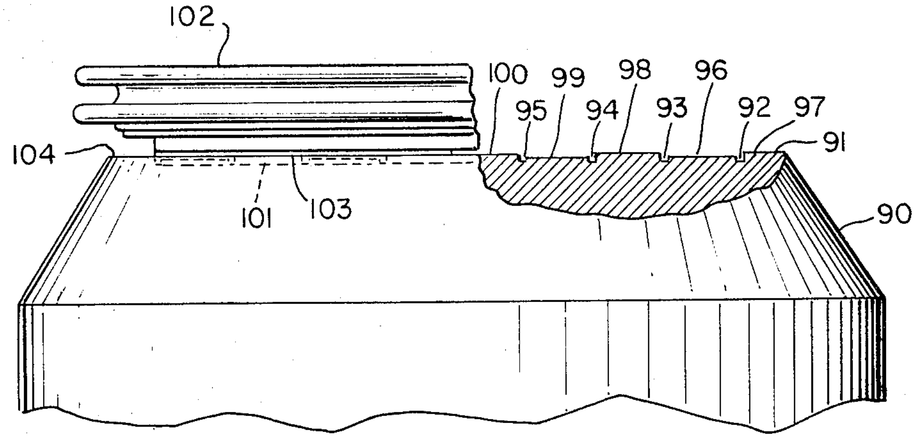
FIG. 6 is a partial side view, partly in section, of a modified copper plug that may be used in any of the heat sinks.
Figure 7:
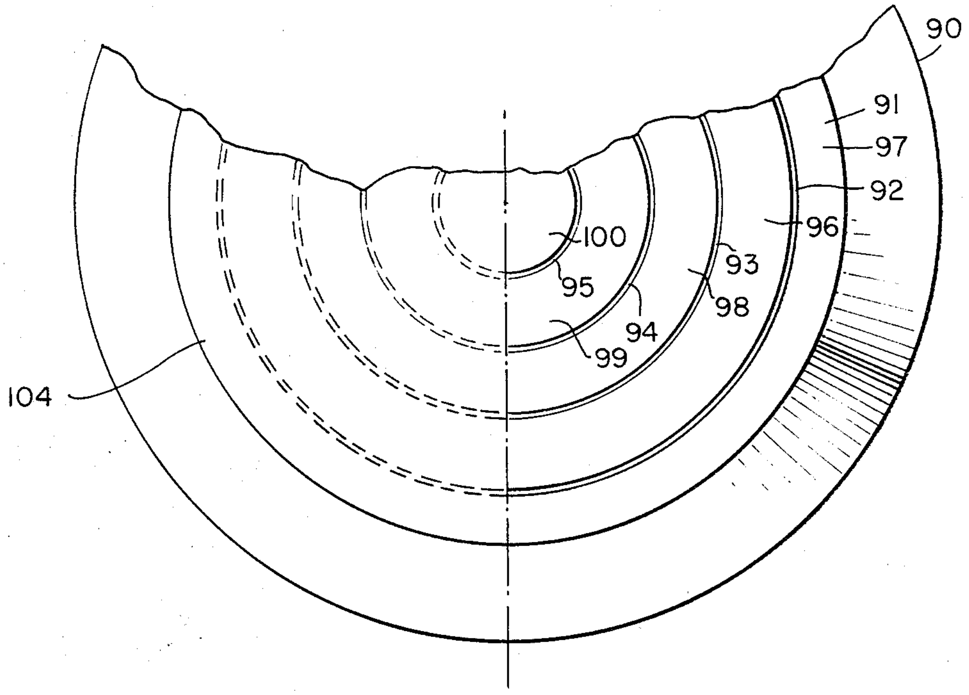
FIG. 7 is a partial plan view of the end face of the plug of FIG. 6.

In FIGS. 6 and 7 a modified copper plug 90 is shown wherein the end face 91 which engages the SCR is provided with a plurality of annular grooves 92, 93, 94, and 95, each about one thirty-second in. wide by one thirty-second in. deep, although these dimensions may be as low as one one Hundred twenty-eighth in. and as high as one sixteenth or one eighth in. Between grooves 92 and 93 an annulus 96 is formed having a level that is at least one or two thousandths of an inch, say one to five or 10 thousandths, below the level of the adjoining annuli 97, 98. Similarly, an annulus 99 is formed between grooves 94 and 95 having a level below that of the adjoining annuli 98 and 100. The annuli 97, 98, and 100 have the same level, which is that of the end face 91; while the annuli 96 and 99 also have the same level but, as described, lower than said end face 91. These annuli 96 and 99 may also be termed recessed annular bands. The end face 91 is coated with a low melting metal having a low electrical resistance, as illustrated by the coating 101 on the left hand side of end face 91. An SCR is partially shown at 102 to indicate how the metal forms an interface between it and the plug, although when the SCR and plug are compressed against such interface, the thickness of the coating 101 may well decrease. The metal is applied in melted form to the end face 91 and allowed to solidify; and it is also applied to the mating face 103 of the SCR, although such end face is not grooved. Grooves may, however, be formed in it. When the power package is in use, the heat generated by the current ($I^2R$) interface losses) melts the metal coating and forms a liquefied bond or interface between the two end faces. The liquefied metal collects in the grooves and recessed annular bands and is retained there by virtue of capillary forces. In this connection, the annuli 96 and 99 should be at a level (below annuli 97, 98) capable of generating sufficient capillary forces to retain the liquefied metal in the interface. The low level range indicated above is suitable, but lower or higher levels may be used where necessary. Thus, the liquefied interface permits expansion without risk of gaps in the joint or interface. Some of the liquefied metal, as in the marginal portions of the interface, note the peripheral band 104, may have a tendency to leak out, but this does not affect the operation of the power package. The grooves, it may be noted, provide reservoirs of the liquefied metal. When the power package is not in use, i.e., is at room temperature, the metal coating solidifies, but it remains in the junction or interface between the plug and the component. A preferred low melting metal is a bismuth-lead-tin-cadmium alloy, m.p. 158° F., which provides a low thermal resistance at the interface, note Example 4. In this connection, conventional thermal joint compounds are known, comprising grease-like materials, which exhibit a thermal resistance of about 0.02° C./watt, but the metal interfaces contemplated by the invention show a thermal resistance only about one third as high. For example, in a power package having a heat flow of 500 watts through one end face of the SCR, the conventional compound exhibits a thermal resistance of 0.02° C./watt and a temperature drop of 10° C. through the interface, whereas with one of the metal interfaces considered herein, the thermal resistance would be 0.006° C./watt and the temperature drop only 3° C., or an improvement 0f 7° C.

Useful low melting point metals include bismuth-lead-tin-cadmium fusible eutectic alloys, particularly those containing 48 to 55 percent bismuth as these tend to exhibit little volume change when passing from the solid to the liquid state and vice versa, although alloys containing 40 to 48 percent and 56 to 60 percent bismuth may also be suitable. Generally, a preferred class of alloys are those having, besides 48 to 55 percent bismuth, about 18 to 40 percent lead, 2 to 15 percent tin, and 0 to 10 percent cadmium. Those alloys having 0 percent cadmium may contain 10 to 21 percent indium, although indium may also be present with the cadmium. Some eutectic alloys illustrative of the foregoing are:

| No. | Bismuth | Lead | Tin | Cadmium | Indium | M. Pt. |
|---|---|---|---|---|---|---|
| A | 44.7% | 22.6% | 8.3% | 5.3% | 19.1% | 117°F. |
| B | 49 | 18 | 12 | | 21 | 136 |
| C | 50 | 26.7 | 13.3 | 10 | | 158 |
| D | 51.6 | 40.2 | | 8.2 | | 197 |
| E | 52.5 | 32 | 15.5 | | | 203 |
| F | 54.0 | | 26.0 | 20.0 | | 217 |

Also useful are some non-eutectic fusible bismuth-lead-tin-cadmium alloys, i.e., those which melt over a range of temperature, provided the temperature range is within the temperature operating range of the SCR or other component to be cooled. These alloys may have 35–51 percent bismuth, 27–38 percent lead, 9–20 percent tin, and 3–10 percent cadmium. Some examples are :

| | | | | | |
|---|---|---|---|---|---|
| Q | 50.5 | 27.8 | 12.4 | 9.3 | 158—163 |
| R | 50 | 34.5 | 9.3 | 6.2 | 158—174 |
| S | 50.7 | 30.9 | 15.0 | 3.4 | 158—183 |
| T | 42.5 | 37.7 | 11.3 | 8.5 | 158—194 |
| U | 35.1 | 36.4 | 19.1 | 9.4 | 158—214 |
| V | 56.0 | 22.0 | 22.0 | — | 203—219 |

It will be understood that for Nos. Q–V, the column headings of Nos. A–F apply. These same column headings apply to the examples below.

It is to be understood that the particular alloy selected will depend on the temerature attained by the component to be cooled, having regard to the result desired, namely, that at steady state operation of the component or power package, the alloy interface shall be in a liquefied state. The foregoing alloys are useful where the component temperature, at steady state operation, is in the range of about 110° to 225° F. For components having a higher operating temperature, eutectic alloys may be chosen having a higher bismuth content, say up to 60 or 70 percent; a higher lead content, when present, say up to 45 percent; higher tin, when present, of up to 60 percent; and higher cadmium, when present, going up to about 40 percent. Some illustrative examples of higher melting of eutectic alloys include:

| No. | Bismuth | Lead | Tin | Cadmium | M. Pt. |
|---|---|---|---|---|---|
| G | 55.5% | 44.5 % | — | — | 255°F. |
| H | 58.0 | — | 42.0 | — | 281 |
| J | 60.0 | — | — | 40.0 | 291 |

Non-eutectic alloys useful at higher temperatures include:

| | | | | | |
|---|---|---|---|---|---|
| W | 67.0 | 16.0 | 17.0 | | —203—300 |
| X | 33.3 | 33.3 | 33.3 | | —203—289 |
| Z | 40.0 | — | 60.0 | | —281—338 |

Other useful low melting alloys are high tin alloys such as soft solder, type metal, fusible metal, pewter, bronze, bell metal, Babbitt metal, White metal, etc. It may be noted that the metal should be able to melt at a temperature low enough to prevent the SCR or other component from overheating.

The invention may be illustrated by the following examples.

Example 1

A conventional signle-unit heat sink of 6063 aluminum alloy was constructed, using commercially available finned aluminum extrusion stock. The unit comprised a web having fins on one side and the other side unfinned, i.e., completely flat and smooth. The unit was 8 in. long, 6.5 in. wide, and 2 in. high. Each of the fins was 1.5 in. long and 0.50 in. thick. The unit was tested with an electrically heated aluminum block, rather than a heat-producing electrical component, in order to be able to accurately measure the heat flow. Electrical resistance elements were embedded in the block, and it was completely insulated except for an end face to which the heat sink unit was clamped. All heat from the block passed through this end face into the heat sink. By measuring the voltage and current to the resistance elements, the amount of heat put into the block could be calculated. Cooling air at a velocity of 1,500 ft./min. was blown over the heat sink by a fan placed endwise thereof. Under these conditions, the thermal resistance of the heat sink, for the end face of the heater, was determined to be 0.136° C./watt, as measured from the heat sink surface which engaged the heater to the ambient air. This quantity represents the temperature rise above air temperature of such surface divided by the amount of heat in watts being conducted through the surface. The quantity is the industry standard for rating the performance of a heat sink.

A second single-unit heat sink was constructed like the first, except that a copper plug of 2.5 in. diameter was shrink-fitted into a recess in the unit. The recess was cut 0.006 in. smaller than the plug diameter, so that the interference factor was 0.006 in. The shrink fitting step was carried out by heating the recessed heat sink unit to 500° F., cooling the plug to −20° F., then immediately engaging the plug in the recess, and allowing the two elements to reach ambient temperature. On testing this heat sink in the same way as the conventional, a thermal resistance of 0.116° C./watt was obtained as measured from the end face of the heater to the air. The reduction in thermal resistance represents the benefit of the copper plug, everything else in the two tests being the same.

Example 2

The copper plug-containing heat sink unit of the second paragraph of Example 1 was subjected to dynamic electrical tests. A high-current electrical resistance heater was clamped against the copper plug of the heat sink unit, and then a 1,500-ampere current was passed through the heater for a sufficient time to raise the temperature of the heat sink to about 150° F. Then the current was shut off and the heat sink temperature allowed to decrease to about 90° F. This represented one cycle. A total of 2,000 cycles were run. No evidence of thermal or electrical degradation of the interface between the copper plug and the aluminum heat sink unit was observed.

Example 3

A two-unit heat sink, each unit being like that described in the second paragraph of Example 1, was constructed, except that 6061 aluminum alloy was used, which has two thirds of the thermal conductivity of the normally used 6063 alloy, and except that the copper plug was 2 in. in diameter. Another difference was that fins were provided on each side of each unit, being present throughout each side except for the area occupied by the plug on the plug-containing side. Since the transfer of heat from the fins to air is not ordinarily an effective process, it is an advantage to increase the number of fins over that of a conventional heat sink. On testing this heat sink, using heaters as described in Example 1, and a cooling air flow of 1,000 ft./min., a total thermal resistance of 0.043° C./watt was obtained. On a comparable basis, for a single heat sink unit, this would be 0.086° C./watt. This compares with a value of 0.116° C./watt reported in the second paragraph of Example 1 for a single unit and represents a substantial improvement in spite of the substantially poorer thermal conductivity of the 6061 alloy. This improvement is due to the increased fin area made possible by having fins on both sides of each unit.

The performance of an identical heat sink to that described in the preceding paragraph, but having a 3 in. diameter copper plug in each unit and made from 6063 alloy, is calculated to be 0.07° C./watt at an air velocity of 1,500 ft./min. For a power SCR dissipating 2,000 watts of heat energy, the temperature rise above air temperature at the copper/SCR interface would be 70° C.; and if the air temperature was 38° C., the absolute temperature at this interface would be 108° C. This would compare with an absolute temperature of 174° C. for the heat sink/SCR interface of the conventional heat sink unit described in the first paragraph of Example 1. A temperature of 174° C. would be clearly in excess of that which can be tolerated by the SCR.

Example 4

The following example may illustrate the use of a liquefied metal interface. A two-unit heat sink, like that described in Example 3, was used to demonstrate the effectiveness of a low melting point metal as an interface coating. A resistor was used as the heat-producing component comprising a spool of 303 type stainless steel having a 0.300 in. thick copper disc silver brazed to each end. The spool barrel diameter was 0.500 in. and its length was 1.25 in., while each spool rim or end was 1.750 in. in diameter and 0.250 in. thick exclusive of the copper disc. The resistance of the barrel was $1.825 \times 10^{-4}$ ohm, and its $I^2R$ loss (heating) at 1,500 amps. would therefore be 410 watts. Asbestos insulation was wound around the barrel to force the heat to flow from end to end and through the copper discs.

One end face of the resistor and the mating face of a copper plug of a heat sink unit were both coated with a thin layer of melted metal comprising a commercial alloy material known as "Cerrobend 158" having the following composition: 50 percent bismuth, 26.17 percent lead, 13.3 percent tin, and 10 percent cadmium. This was No. C in the above lists. Its melting point was 158° F. After application, the coatings solidified. The heat sink was then placed in operation in the following way: the heat sink units and the resistor were clamped together using a standard commercial clamp so that each end face (or copper disc) of the resistor was in mating contact with a copper plug of the heat sink. A current of 1,500 amps. was passed through the assembly, including the resistor and the interfaces. The interface alloy was observed to melt almost immediately. The assembly was subjected to 1,000 thermal cycles, each involving changing the current from 0 to 1,500 amps. and a temperature change from 120° to 180° F. Except for an initial burn-in period, no degradation was observed. The interface resistance of the alloy joint was determined to be 0.006° C./watt for one end face of the resistor. At the end of the test, the heat sink was disassembled. The interface had to be heated to 185° F. to melt the joint. Metal was observable in the grooves of the copper plug, these having been formed as in FIGS. 6 and 7.

The use of a low melting metal as an interface is applicable to any of the embodiments of the invention.

Example 5

A power semiconductor was tested in a two-unit heat sink of the invention and also in a two-unit conventional heat sink. The heat sink of the invention was like that shown in FIG. 2, i.e., each unit had fins on both sides and was provided with a copper plug. The conventional heat sink comprised unit that were finned only on one side and that contained no plug. The semiconductor was a silicon diode, type HD-2000-1, supplied by Power Semiconductors Inc. It was disposed in the present heat sink as shown in FIG. 2, and a thermocouple was located in the concaved edge of the central section of the insulator 69, this section being the one just beneath the section of larger diameter that is touched by the tie line for numeral 69. In the conventional heat sink, the semiconductor was similarly disposed, as was the thermocouple.

The thermocouple, in each case, measured the surface temperature of the semiconductor because it was not possible to enter the interior of the device without destroying its performance. It will be understood, therefore, that the semiconductor internal temperature is higher than that reported below, but for purposes of comparison, the reported temperatures are a valid measure of the performance of the present heat sink versus the conventional one.

Two Tarzan TN3A2 fans made by Rotron Incorporated were located at each end of the power package; one blew air into the heat sink along the fins and the other drew air out. The air velocity was about 1,100 ft./min. The fan arrangement was identical for both tests.

The length of both heat sinks was identical, being 7 inches. The method of attaching the current leads to both heat sinks was also identical. The method of measuring current, using a Weston AC/DC ammeter, model 370, in conjunction with a 240:1 current transformer, was identical for both tests. In so far as possible, the entire arrangement for both tests was maintained identical in order to provide a true comparison.

The results of the tests are as follows:

| | Present Heat Sink | Conventional Heat Sink |
|---|---|---|
| Current, amps. | 710 | 710 |
| Semiconductor Temperature Rise, °C. | 23.5 | 44.9 |

That is, for the same current passing through each power package, the conventional heat sink gave a device temperature 21.4° C. higher. A second test was run to determine at what current the conventional heat sink would give a device temperature rise of 23.5° ) C., and this current turned out to be 476 amps. In other words, for the same device temperature, the present heat sink will carry about 50 percent more current.

Another way of looking at the results is to observe that the temperature rise of the present heat sink is roughly one half that of the best commercially available conventional heat sink, using the same current.

It will be understood that the invention is capable of obvious variations without departing from its scope.

In the light of the foregoing description, the following is claimed.

1. In a heat sink for cooling a heat-producing electrical or electronic component comprising at least two units each made up of a web having fins extending from one side and having on the other side a component-engaging surface, wherein opposite faces of said component are engageable by a pair of said units, means on the units for holding the same in compressive engagement with the component, and wherein said units are made of aluminum to pass current and to conduct heat away from said component and to dissipate said heat to the surrounding atmosphere, the improvement comprising a substantially centrally located recess in the web of each unit which opens through said component-enagaging surface, a copper plug in each recess having a fit therein sufficiently tight to permit effective heat transfer from the plug to the web, each plug having an exposed face which engages, in heat exchange relation, one of said component faces and which serves to transfer heat from the component through the plug to said web, a plurality of heat-dissipating fins on said other side of the web of each unit which extend substantially throughout the entire area thereof except for the area occupied by said plug, and said units being compressively held together so that the plugs make effective electrical contact with said component faces.

2. Heat sink of claim 1 wherein siad plug has a shrink fit in the recess of each unit by virtue of which the plug is in a state of compression in the recess during the passage of heat therethrough.

3. Heat sink of claim 1 wherein one of said units is more than twice as long as the other and contains a second recess spaced from the first, a copper plug plug in said second recess, and said longer unit being adapted to be used with two of said shorter units to support and cool a pair of components.

4. Heat sink of claim 1 wherein said component is a power semiconductor.

5. Heat sink of claim 4 wherein a layer of a low melting point metal is present between each plug face and its mating component face to form an interface therebetween, said metal being solid at ambient conditions but having a melting point sufficiently low that the passage of heat through the interface is enough to melt the metal and to form a liquefied metal interface.

6. Heat sink of claim 5 wherein each plug face has a plurality of annular grooves and recessed bands which serve to retain said liquefied metal in each said interface.

7. Heat sink of claim 6 wherein said metal has a melting point in the range of 140° to 250° F.

8. Heat sink of claim 1 wherein a liner of an electrically insulating, thermally conducting material is present between each plug and the walls of said recess, whereby said heat sink units do not pass current.

9. In a heat sink for cooling a heat-producing electrical or electronic component comprising a metal unit made up of a web having fins, a component-engaging surface on said web for engaging a face on said component, an electrical connection secured to another component face and extending from the heat sink, the improvement comprising a metal plug embedded in said web sufficiently tightly to provide effective heat transfer from the plug to the web, said plug having an exposed face which engages, in heat exchange relation, said first-mentioned component face and which serves to transfer heat from the component through the plug to said web, said plug making effective electrical contact with said component, the metal of said unit having a thermal conductivity of at least 25 BTU per hr. per sq. ft. per °F. per ft., and the metal of the plug having a thermal conductivity that is at least twice that of the metal of said unit.

10. Heat sink of claim 9 wherein the metal of said unit has a thermal conductivity of at least 90 BTU per hr. per sq. ft. per °F. per ft.

* * * * *